United States Patent [19]

Sharp

[11] 3,984,628

[45] Oct. 5, 1976

[54] REMOTE CAMERA-POSITION CONTROL

[76] Inventor: Paul Grayson Sharp, P.O. Box 20133, St. Louis, Mo. 63123

[22] Filed: Jan. 13, 1975

[21] Appl. No.: 540,581

[52] U.S. Cl. .............................. 178/6.8; 178/DIG. 6; 178/DIG. 30; 318/618
[51] Int. Cl.² ........................................ H04N 5/26
[58] Field of Search ............. 178/6, 6.8, 7.92, 7.81, 178/DIG. 30, DIG. 38, DIG. 6; 318/618

[56] References Cited
UNITED STATES PATENTS

| | | | |
|---|---|---|---|
| 3,057,953 | 10/1962 | Guerth | 178/6.8 |
| 3,417,198 | 12/1968 | Loyd | 178/6.8 |
| 3,437,748 | 4/1969 | Lataday | 178/6.8 |
| 3,634,008 | 1/1972 | Plummer | 178/DIG. 30 |
| 3,673,512 | 6/1972 | Walters | 318/618 |
| 3,711,638 | 1/1973 | Davies | 178/6.8 |
| 3,760,253 | 9/1973 | Hess | 318/618 |
| 3,914,540 | 10/1975 | Slater | 178/DIG. 30 |

Primary Examiner—Howard W. Britton
Attorney, Agent, or Firm—Sherman & Shalloway

[57] ABSTRACT

A camera-position control is disclosed which includes a multi-axial, manual control of a generator for an electronic pointer for generating a spot at the focus of interest of a scene and for directing the spot to accompany a moving subject or to migrate to a second focus of interest, the signal generated for moving said spot being coupled to a multi-axial, camera-positioning drive circuit which includes tachometer generators whose output is imposed on the generated positioning signal for their respective axes to oppose that signal and thereby impose a rate control on the camera-positioning drive.

10 Claims, 2 Drawing Figures

REMOTE CAMERA-POSITION CONTROL

BACKGROUND OF THE INVENTION

The present invention relates to the remote control of optical units and is concerned, more particularly, with the remote positioning and repositioning of television cameras.

BRIEF DESCRIPTION OF THE PRIOR ART

Remote positioning or aiming of television cameras has been accomplished in a variety of prior systems, some of which are quite sophisticated, as in the automatic tracking of "targets".

However, many service or program requirements cannot justify the more highly sophisticated systems with their attendant capital and maintenance costs.

In broadcasting and/or video taping, for example, the director will direct camera-aiming either through direct voice communication with the cameraman using the spoken word or by means of microphone/earphone combination to give instructions. The cameraman, therefore, is required to aim, or pan, in accordance with the director's instructions. This must be accomplished by the cameraman in addition to, and frequently simultaneously with, the demands or requirements of aperture regulation, lens-zooming, camera-dolly repositioning and refocusing.

In many circumstances, therefore, the cameraman simply cannot accommodate all of the changing requirements at the same time, so that at least one of the required functions will suffer. For example, a man who is concentrating on accurate motion or traversing of the camera and continuous refocusing or zooming during the camera traverse often will be late in correcting his "aperture" if a significant change in subject lighting is encountered at the same time. This is often the case in televising football games or golf matches, where primary concern is given to tracking the ball as the center of attention.

However, when primary concern is given to exposure control and focusing, such as in a studio set and with people and their faces being of prime interest, it is often the smoothness of camera motion that suffers last attention with a resultant, annoying or distracting effect as a consequence of sudden or overlying rapid camera traverse.

This problem will vary from cameraman to cameraman but is accentuated, when relatively large aiming changes are called for by the director, to the degree that it is often necessary to cut to another camera, to avoid blurring of the image, until the preferred camera catches up to the point of interest.

The aforementioned problems, which occur with highly-skilled, professional cameramen, become most acute when entirely remotely-controlled television cameras are subject to control by less-skilled operators, such as guards in surveillance or security systems. The confusing blurring, overrun or loss of subject which results can be sufficiently distracting as to impair the guards' effectiveness in evaluating the significance of the action he is attempting to follow with the camera.

Therefore, the prior systems for remotely controlling the position of television cameras have not been found to be entirely satisfactory.

SUMMARY OF THE INVENTION

In general, the preferred form of camera-position control system of the present invention comprises multi-axial positioning means for aiming the camera, a multi-axial signal communication switch in signalcommunication with the positioning means via a control circuit, and variable rate-control means including means responsive to camera motion for modulating the control signal supplied to the positioning means from the switch means.

Preferably, the control circuit includes balancing potentiometers for balancing a voltage signal imposed by the control switch, and tachometer voltage-generators coupled to the camera-orienting drive to generate a voltage opposing the signal voltage and which is variable to control the rate of camera motion.

OBJECTS OF THE INVENTION

It is an object of the present invention to provide a remote camera-positioning control system for the smooth traversing of television cameras.

It is a further object of the invention to provide a remote control system for aiming television cameras at a controlled, smooth rate of camera motion.

It is another object of the present invention to provide a remote control system for the smooth and precise aiming of manned television cameras without requiring ultimate aiming of the camera by the attending cameraman.

A further object of the present invention is the provision of a remote control system for the smooth and precise aiming of manned cameras simultaneously with the location and relocation of an electronic monitor pointer.

A particular object of the present invention is the provision of a remote control system for the smooth and precise aiming of manned cameras simultaneously with the program-producers relocation of an electronic monitor pointer, whether in changing the video signal being broadcast or taped or in changing the aim of a camera, in preparation for the video signal thereof being selected for broadcast or taping, without the necessity for ultimate aiming of the cameras by the attending cameramen.

BRIEF DESCRIPTION OF THE DRAWINGS

These and other objects of the invention may be more fully understood from the following description and the accompanying drawings, in which.

DETAILED DESCRIPTION OF THE PREFERRED EMBODIMENT

Figure 1:
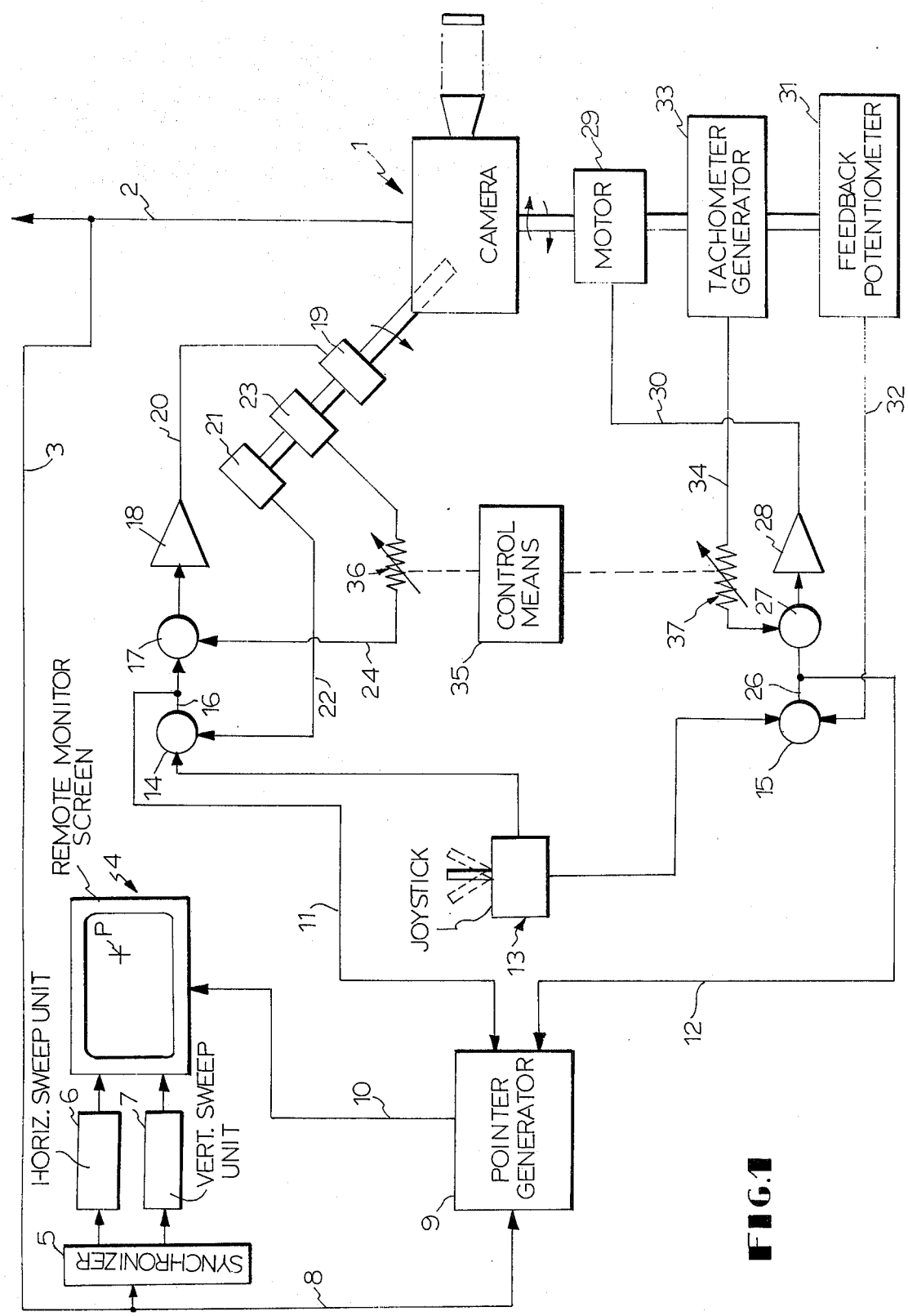
FIG. 1 is a schematic diagram showing the preferred form of control system of the invention.

As shown in FIG. 1, the preferred form of remote camera-positioning control system of the invention includes a camera 1 having a video output circuit including a main output line 2 and a branch line 3 serving a remote monitor screen 4 via a conventional circuit including a synchronizer 5 and horizontal and vertical sweep units 6 and 7, respectively.

The branch line 3 also communicates with a pointer-signal branch line 8 which supplies a conventional pointer generator 9 which, in turn, communicates with the monitor via pointer signal line 10 to supply a movable pointer image "P" on the video display.

The location of the pointer image P, with regard to the total video display, is controlled by vertical and horizontal control signals via lines 11 and 12, respectively, which are received from a biaxial, manual control switch or "joystick" 13. Preferably, the joystick 13 includes a potentiometer which generates a voltage, the magnitude of which is indicative of the position of the joystick. The line 11 includes a primary summing junction 14, while the line 12 includes a primary summing junction 15, which enable the joystick to steer the camera and image P.

The output of the summing junction 14 is also supplied via a line 16 to a secondary summing junction 17 which, in turn, communicates with a servoamplifier 18 which serves the horizontal-axis, elevation motor 19 on the camera 1 via a line 20.

An elevation position-feedback potentiometer 21 is directly coupled on the horizontal axis of the camera 1 and has its output in communication with the primary summing junction 14 via a line 22. Similarly, a tachometer generator 23 is directly coupled to the rotating shaft of the motor 19 and has its output in communication with the secondary summing junction 17 via a line 24.

The primary summing junction 15 in horizontal or azimuth signal line 12 has its output also supplied via a line 26 to a secondary summing junction 27 which, in turn, communicates with an azimuth servoamplifier 28 which serves the vertical-axis, azimuth motor 29 of the camera via a line 30.

An azimuth position-feedback potentiometer 31 is directly coupled on the vertical axis of the camera 1 and has its output in communication with the primary summing junction 15, via a line 32. A tachometer generator 33 is directly coupled to the rotating shaft of the motor 29 and has its output in communication with the secondary summing junction 27 via a line 34.

The feedback from the tachometer generators 23 and 33 includes an overall rate-control means 35 for controlling the rate of camera motion. The rate control means 35 includes a variable resistor 36 in the tachometer signal line 24 and a variable resistor 37 in the tachometer signal line 34.

In operation of the system of FIG. 1, optional displacement of the multi-axial, manual switch or joystick 13 effects the reorientation of both the pointer signal "P" and the camera 1.

The signals from the joystick are correlated to the direction and distance to which the joystick is manually displaced on its two axes and is supplied via the lines 11 and 12 and their respective primary summing junctions 14 and 15 to the input of the pointer generator-controller 9.

At the same time, these elevation and azimuth signals from the joystick are supplied via the outputs of the primary summing junctions 14 and 15, to the elevation and azimuth motors 19 and 29, respectively, of the camera.

Rotation of the motors 19 and 29 then supplies an opposing feedback signal to be supplied to their respective primary and secondary summing junctions. For simplicity, the functioning of one of the motor circuits will be detailed, since both function in a similar manner.

A voltage supplied to the primary summing junction 14 by the joystick 13 is applied to the secondary summing junction 17, amplified by the elevation servoamplifier 18 and supplied to the elevation motor 19 to cause appropriate rotation of the camera.

However, as the camera begins its rotation on the horizontal axis, the feedback potentiometer 21 and the tachometer generator 23 are then actuated to apply a counteracting voltage to the primary and secondary summing junctions 14 and 17, respectively.

Therefore, the feedback signal of the potentiometer is imposed to modify and, eventually, to cancel the output of the primary summing junction 14, thereby effecting the output to both the pointer generator 9 and the elevation motor 19.

The opposing signal from the tachometer generator 23, during this time, is imposed on the secondary summing junction to modify its output to the elevation motor by reducing the voltage supplied to the servoamplifier 18. The variable resistor 36, which is regulated by the rate control means 35 operates to control the extent to which the tachometer-generator signal opposes the signal supplied to the secondary summing junction 17 and, therefore, the summed signal supplied to the servoamplifier 18.

Considering the operation of the elevation motor circuit more specifically, the potentiometer 21 has an output voltage of the same scale as the voltage impressed on the summing junction 14 by the potentiometer of the joystick 13; however, the output voltage of the potentiometer 21 is opposite in sign to the voltage impressed by the joystick. The potentiometer 21 supplies the summing junction 14 with a continuous signal, the magnitude of which is indicative of the vertical orientation of the camera 1, while the potentiometer of the joystick 13 supplies the summing junction 14 with a continuous signal, the magnitude of which is indicative of the vertical orientation of the joystick. Since these two sets of signals are of the same scale and opposite in sign, they will cancel one another when the position of the camera 1 corresponds to the position of the joystick 13. When these signals cancel one another, there will be no output impressed on the line 16 and, therefore, the motor 19 will not be energized. When the motor 19 is not energized, the camera 1 will not move and will retain its vertical orientation.

In operation, the camera 1 will lag behind the joystick 13, while the motor 19 continuously urges the camera to catch up. The greater the differential between the camera position and the joystick position, the greater the voltage impressed on line 16 since the voltage on line 16 is directly proportional to the difference between the voltage from joystick 13 and that from feedback potentiometer 21. Consequently, the motor 19 will rotate with a torque and velocity proportional to the amplitude of the voltage on line 16 since it is this voltage which is subsequently impressed over line 20 after being amplified by amplifier 18.

The negative feedback arrangement resulting from opposing the signals from potentiometer 21 and joystick 13 is not sufficient to provide precision control of the camera 1 since the motor 19 will tend to accelerate the camera rather rapidly. Rapid acceleration and deceleration prevent smooth operation of the camera and cause frequent over-shooting. In order to coordinate the motion of the camera 1 with the motion and position of the joystick 13 in such a way as to provide a smoothly operating system, the tachometer generator 23 is employed.

The signals from the tachometer generator 23 are of the same scale as those impressed on line 16, but are opposite in sign thereto. In addition, these signals are proportional in magnitude to the speed of the motor 19. Upon being impressed on the summing junction 17, they are algebraically added to the signal on line 16 to reduce the amplitude of the signal being supplied to amplifier 18 in order to temper the speed of motor 19.

In order to control the amplitude of the voltage impressed over line 24, the variable resistor 36 is inserted in line 24. By adjusting the resistor 36 manually or otherwise, the amplitude of the voltage generated by tachometer generator 23 may be reduced before being impressed on summing junction 17 so that, when algebraically added to the voltage on line 16, a desirable output from summing junction 17 results. In essence, the tachometer generator 23 serves to damp-out relatively wild and abrupt motion of the camera 1.

Since the elevation and azimuth circuits are the same in components and in function, it is possible to regulate both the variable resistors 36 and 37 from a common control 35 available to the director adjacent the manual joystick 13.

Therefore, the system of FIG. 1 provides a smooth and synchronized traversing of both the pointer signal P and the camera aim to relocate a new point of interest in the center of the field of view or to follow a moving subject with the system to keep the subject in the center of the picture. Also, this smooth and synchronized traversing may be effected at differing traversing rates according to the optional setting of the rate control means 35.

Figure 2:
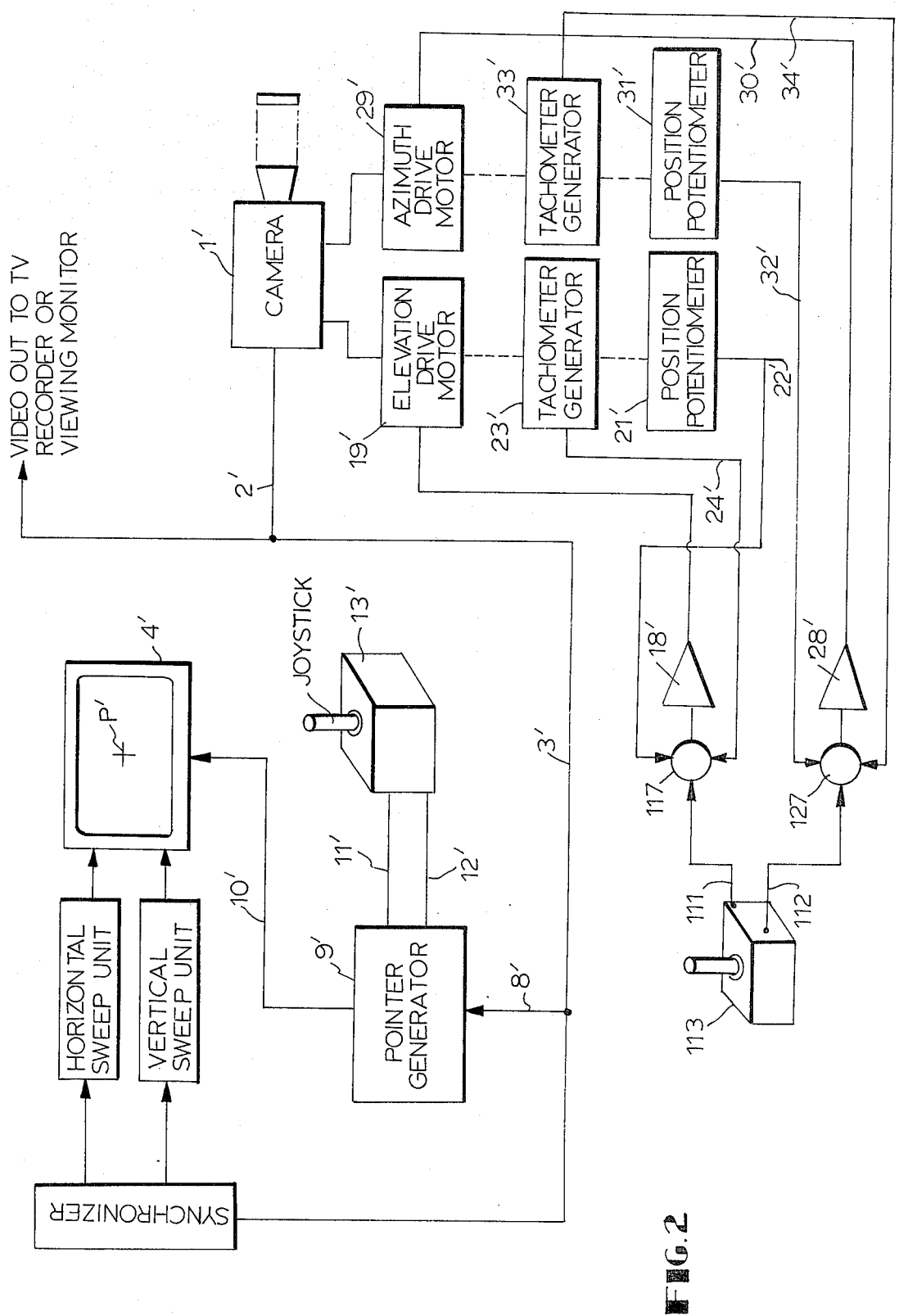
FIG. 2 is a schematic diagram of a modified form of control system of the invention.

In FIG. 2 is shown a system for camera aiming or traversing which is advantageous in cases in which it is desired to separate the control of the camera from that of the pointer signal. The system of FIG. 2 is particularly advantageous in surveillance systems.

In this figure, similar elements are identified by the same numerals primed, as those used with reference to FIG. 1.

The modified system includes a camera 1' having a video output 2' and serving a monitor 4' via a line 3' and a conventional circuit. The line 3' has a branch line 8' which supplies a pointer generator-controller 9' which is controlled by a multi-axial, manual switch or joystick 13' via direct elevation and azimuth signal lines 11' and 12', respectively.

A camera-traversing control circuit includes a multi-axial, manual switch or joystick 113 having elevation and azimuth signal lines 111 and 112, respectively.

The elevation signal line 111 serves the elevation motor 19' via a summing junction 117 and a servoamplifier 18'. The elevation motor has a position feedback potentiometer 21' and a tachometer generator 23' whose outputs are both supplied to the summing junction 117 via lines 22' and 24', respectively.

The operation of the system of FIG. 2 is generally similar to that of FIG. 1, the primary difference being that the camera-aiming control circuit is independent of the pointer P, while the summing junctions 117 and 127 modulate their output signals to the servoamplifiers in response to three inputs from their respective joystick, potentiometer and tachometer-generator lines.

If desired, as is often the case in surveillance systems, a self-centering switch may be employed for the joystick 113, in which the camera would be caused to re-aim itself to a desired spot upon release of the joystick.

Thus, it is apparent that the present invention provides a particularly advantageous camera-position control which provides a smooth and accurate traversing of the camera and which may be synchronized with a pointer signal generator for a smooth and synchronous traverse of both the pointer signal and the camera.

Various changes may be made in the details of the invention, as disclosed, without sacrificing the advantages thereof or departing from the scope of the appended claims.

What is claimed is:

1. A camera-positioning control system for television cameras comprising:
    a. drive means for traversing a television camera from an initial orientation to a desired orientation relative to a stationary base;
    b. position indicating means generating first signals proportional in magnitude to the difference between the initial orientation and desired orientation of the camera;
    c. velocity indicating means for generating second signals proportional in magnitude to the speed at which the drive means traverses the camera from the initial position to the desired position and of the same polarity as the first signal;
    d. steering means remote from said drive means and said camera for generating control signals equal in magnitude but opposite in polarity from said first signals as said steering means moves from an initial position to a desired position corresponding to said position of said camera; and
    e. summing means for algebraically adding said control signals to said first and second signals to produce drive signals for energizing said motor to traverse said camera according to the position of said steering means.

2. The system of claim 1, further including means for selectively varying the magnitude of the second signals prior to adding the second signals in the summing means.

3. The system of claim 1, wherein said position indicating means are potentiometers driven by said drive means.

4. The system of claim 1, wherein the velocity indicating means are tachometer generators driven by said drive means.

5. The system of claim 1, wherein the steering means is a lever which, when displaced, displaces potentiometers to generate said control signal.

6. The system of claim 1, further including a video screen and a pointer generator, wherein said pointer generator is controlled by said steering means to position a point on said screen corresponding to the desired orientation of said television camera, and wherein said drive means traverses said television to said desired orientation after said point is positioned.

7. The system of claim 1, further including a video screen and a pointer generator, wherein said pointer generator positions a point on said screen, in accordance with the orientation of said camera.

8. The system of claim 1, wherein the summing means includes:
    a. first summing junctions for adding algebraically the first signals to the control signals to produce an output signal; and b. a second summing junction for adding algebraically the second signals to said output signal of said first summing junction to produce said drive signals.

9. The system of claim 8, further including means for selectively varying the magnitude of the second signals prior to adding the second signals in the second summing junction.

10. The system of claim 8, further including amplifying means to increase the power of said drive signal before applying said drive signal to energize said drive means.

* * * * *